(12) United States Patent
Choi et al.

(10) Patent No.: US 11,764,441 B2
(45) Date of Patent: Sep. 19, 2023

(54) SEPARATOR FOR RECHARGEABLE LITHIUM BATTERY AND RECHARGEABLE LITHIUM BATTERY INCLUDING THE SAME

(71) Applicant: SAMSUNG SDI CO., LTD., Yongin-si (KR)

(72) Inventors: Hyeonsun Choi, Yongin-si (KR); Yongkyoung Kim, Yongin-si (KR); Jungyoon Lee, Yongin-si (KR); Yangseob Kim, Yongin-si (KR)

(73) Assignee: SAMSUNG SDI CO., LTD., Yongin-si (KR)

( * ) Notice: Subject to any disclaimer, the term of this patent is extended or adjusted under 35 U.S.C. 154(b) by 411 days.

(21) Appl. No.: 16/716,714

(22) Filed: Dec. 17, 2019

(65) Prior Publication Data

US 2020/0388808 A1 Dec. 10, 2020

(30) Foreign Application Priority Data

Jun. 7, 2019 (KR) ........................ 10-2019-0067542

(51) Int. Cl.
*H01M 50/446* (2021.01)
*H01M 10/0525* (2010.01)
(Continued)

(52) U.S. Cl.
CPC ....... *H01M 50/446* (2021.01); *H01M 8/0202* (2013.01); *H01M 10/0525* (2013.01);
(Continued)

(58) Field of Classification Search
None
See application file for complete search history.

(56) References Cited

U.S. PATENT DOCUMENTS

2015/0050544 A1\* 2/2015 Nam .................. H01M 50/431
429/144
2015/0303427 A1 10/2015 Hyun et al.
(Continued)

FOREIGN PATENT DOCUMENTS

CN 104377328 A 2/2015
CN 104584267 A 4/2015
(Continued)

OTHER PUBLICATIONS

Extended European Search Report dated Feb. 19, 2020.
(Continued)

*Primary Examiner* — Jeremiah R Smith
(74) *Attorney, Agent, or Firm* — Lee IP Law, P.C.

(57) ABSTRACT

A separator for a rechargeable lithium battery and a rechargeable lithium battery including the separator, the separator including a porous substrate, and a coating layer on at least one surface of the porous substrate, wherein the coating layer includes a heat resistant binder including a (meth)acryl copolymer including a first structural unit and a second structural unit, the first structural unit being a structural unit of a (meth)acrylamide and the second structural unit being a structural unit of a (meth)acrylic acid, a (meth) acrylate, a (meth)acrylonitrile, a (meth)acrylamido sulfonic acid, a (meth)acrylamido sulfonate salt, or a combination thereof; polyethylene particles; and first inorganic particles, and an average particle size (D50) of the first inorganic particles is larger than an average particle size (D50) of the polyethylene particles.

18 Claims, 7 Drawing Sheets

(51) Int. Cl.
  *H01M 50/46* (2021.01)
  *H01M 8/0202* (2016.01)
  *H01M 50/489* (2021.01)
  *H01M 50/42* (2021.01)
  *H01M 50/454* (2021.01)
  *H01M 50/457* (2021.01)
  *H01M 50/417* (2021.01)
  *H01M 50/451* (2021.01)
  *H01M 4/02* (2006.01)
  *H01M 50/443* (2021.01)
  *H01M 50/431* (2021.01)
  *H01M 50/411* (2021.01)
  *H01M 50/434* (2021.01)

(52) U.S. Cl.
  CPC ......... *H01M 50/417* (2021.01); *H01M 50/42* (2021.01); *H01M 50/451* (2021.01); *H01M 50/454* (2021.01); *H01M 50/457* (2021.01); *H01M 50/461* (2021.01); *H01M 50/489* (2021.01); *H01M 50/411* (2021.01); *H01M 50/431* (2021.01); *H01M 50/434* (2021.01); *H01M 50/443* (2021.01); *H01M 2004/027* (2013.01); *H01M 2004/028* (2013.01)

(56) References Cited

U.S. PATENT DOCUMENTS

| | | | |
|---|---|---|---|
| 2016/0141567 A1 | 5/2016 | Meng | |
| 2016/0141581 A1* | 5/2016 | Sasaki | H01M 50/409 |
| | | | 429/144 |
| 2016/0190535 A1* | 6/2016 | Fukuchi | H01M 50/411 |
| | | | 525/299 |
| 2016/0218340 A1* | 7/2016 | Ryu | H01M 50/44 |
| 2017/0012264 A1* | 1/2017 | Carlson | H01G 11/52 |
| 2017/0117525 A1* | 4/2017 | Suzuki | B32B 19/02 |
| 2017/0155118 A1* | 6/2017 | Hasegawa | H01M 50/446 |
| 2017/0279152 A1* | 9/2017 | Toyoda | H01M 10/0525 |
| 2017/0338461 A1* | 11/2017 | Seo | H01M 4/624 |
| 2018/0034058 A1* | 2/2018 | Suh | H01M 4/587 |
| 2018/0053963 A1 | 2/2018 | Tanaka | |
| 2019/0115577 A1 | 4/2019 | Kim et al. | |
| 2019/0165349 A1* | 5/2019 | Kim | H01M 50/411 |
| 2020/0127263 A1* | 4/2020 | Annaka | H01M 4/622 |
| 2021/0189037 A1 | 6/2021 | Pan et al. | |

FOREIGN PATENT DOCUMENTS

| | | |
|---|---|---|
| CN | 104752659 A | 7/2015 |
| CN | 105324868 A | 2/2016 |
| CN | 106220779 A | 12/2016 |
| CN | 106328869 A | 1/2017 |
| CN | 107394087 A | 11/2017 |
| CN | 107431169 A | 12/2017 |
| CN | 109671893 A | 4/2019 |
| JP | 2013-105681 A | 5/2013 |
| JP | 2019-075374 A | 5/2019 |
| KR | 10-2016-0061317 A | 5/2016 |
| KR | 10-2017-0129643 A | 11/2017 |
| KR | 10-2017-0129645 A | 11/2017 |
| WO | WO 2018/027652 A1 | 2/2018 |
| WO | WO 2018/198940 A1 | 11/2018 |

OTHER PUBLICATIONS

Korean Office Action dated Dec. 8, 2021 for corresponding Korean Patent Application No. 10-2019-0067542.

Chinese Office Action dated Jun. 7, 2022, and accompanying Search Report dated May 28, 2022, for corresponding Chinese Patent Application No. 201911356647.7.

Chinese Office action and Search Report dated Jan. 4, 2023.

* cited by examiner

SEPARATOR FOR RECHARGEABLE LITHIUM BATTERY AND RECHARGEABLE LITHIUM BATTERY INCLUDING THE SAME

CROSS-REFERENCE TO RELATED APPLICATION

Korean Patent Application No. 10-2019-0067542, filed on Jun. 7, 2019, in the Korean Intellectual Property Office, and entitled: "Separator for Rechargeable Lithium Battery and Rechargeable Lithium Battery Including the Same," is incorporated by reference herein in its entirety.

BACKGROUND

1. Field

Embodiments relate to a separator for a rechargeable lithium battery and a rechargeable lithium battery including the same are disclosed.

2. Description of the Related Art

A separator for an electrochemical battery is an intermediate film that separates a positive electrode and a negative electrode in a battery, and continuously maintains ion conductivity to facilitate charge and discharge of a battery.

SUMMARY

The embodiments may be realized by providing a separator for a rechargeable lithium battery, the separator including a porous substrate, and a coating layer on at least one surface of the porous substrate, wherein the coating layer includes a heat resistant binder including a (meth)acryl copolymer including a first structural unit and a second structural unit, the first structural unit being a structural unit of a (meth)acrylamide and the second structural unit being a structural unit of a (meth)acrylic acid, a (meth)acrylate, a (meth)acrylonitrile, a (meth)acrylamido sulfonic acid, a (meth)acrylamido sulfonate salt, or a combination thereof; polyethylene particles; and first inorganic particles, and an average particle size (D50) of the first inorganic particles is larger than an average particle size (D50) of the polyethylene particles.

The average particle size (D50) of the first inorganic particles may be about 1.0 μm to about 3.0 μm.

The average particle size (D50) of the polyethylene particles may be about 0.1 μm to about 1.0 μm.

A weight ratio of the first inorganic particles and the polyethylene particles may be about 50:50 to about 1:99.

A weight ratio of the heat resistant binder:a sum of the first inorganic particles and the polyethylene particles may be about 1:20 to about 1:40.

The first inorganic particles may include $Al_2O_3$, $SiO_2$, $TiO_2$, $SnO_2$, $CeO_2$, MgO, NiO, CaO, GaO, ZnO, $ZrO_2$, $Y_2O_3$, $SrTiO_3$, $BaTiO_3$, $Mg(OH)_2$, boehmite, or a combination thereof.

The (meth)acryl copolymer may have a glass transition temperature (Tg) of about 150° C. or higher.

The first structural unit may be included in an amount of about 55 mol % to about 95 mol %, based on 100 mol % of the (meth)acryl copolymer, and the second structural unit may be included in an amount of about 5 mol % to about 45 mol %, based on 100 mol % of the (meth)acryl copolymer.

The second structural unit may include a structural unit of a (meth)acrylic acid, a (meth)acrylate, a (meth)acrylonitrile, or a combination thereof in an amount of about 0 mol % to 40 mol %, based on 100 mol % of the (meth)acryl copolymer, and a structural unit of a (meth)acrylamido sulfonic acid, a (meth)acrylamido sulfonate salt, or a combination thereof in an amount of about 0 mol % to about 10 mol %, based on 100 mol % of the (meth)acryl copolymer, provided that the second structural unit is included in a total amount of about 5 mol % to about 45 mol %, based on 100 mol % of the (meth)acryl copolymer.

The first structural unit may be represented by Chemical Formula 1, the second structural unit of a (meth)acrylic acid, a (meth)acrylate, or a (meth)acrylonitrile may be represented by Chemical Formula 2, Chemical Formula 3, Chemical Formula 4, or a combination thereof, and the second structural unit of a (meth)acrylamido sulfonic acid, or a (meth)acrylamido sulfonate salt may be represented by Chemical Formula 5, Chemical Formula 6, Chemical Formula 7, or a combination thereof:

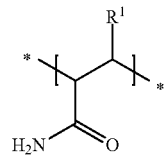

[Chemical Formula 1]

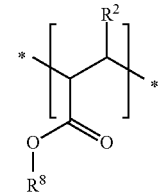

[Chemical Formula 2]

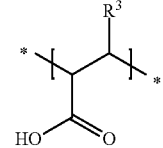

[Chemical Formula 3]

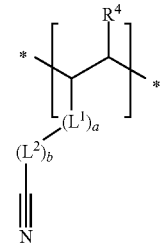

[Chemical Formula 4]

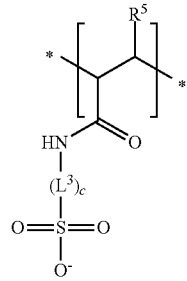

[Chemical Formula 5]

-continued

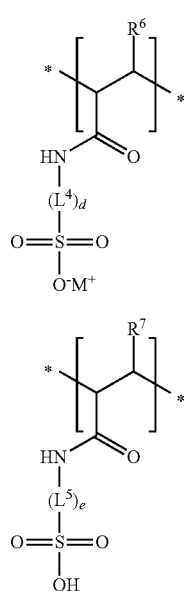

[Chemical Formula 6]

[Chemical Formula 7]

in Chemical Formula 1 to Chemical Formula 7, $R^1$ to $R^7$ may each independently be hydrogen or a C1 to C6 alkyl group, $R^8$ may be a substituted or unsubstituted C1 to C20 alkyl group, $L^1$ may be, e.g., —C(=O)—, —C(=O)O—, —OC(=O)—, —O—, or —C(=O)NH—, $L^2$ to $L^5$ may each independently be a substituted or unsubstituted C1 to C10 alkylene group, a substituted or unsubstituted C3 to C20 cycloalkylene group, a substituted or unsubstituted C6 to C20 arylene group, or a substituted or unsubstituted C3 to C20 divalent heterocyclic group, a, b, c, d and e may each independently be an integer of 0 to 2, and M may be an alkali metal.

A thickness of the coating layer may be about 1 μm to about 5 μm.

The separator may further include a heat resistant layer or an adhesive layer.

The separator may include the heat resistant layer, the heat resistant layer may be on at least one surface of the porous substrate, and the coating layer may be on another surface of the porous substrate or on a surface of the heat resistant layer.

The separator may include the adhesive layer, and the adhesive layer may be on a surface of the porous substrate, a surface of the heat resistant layer, or a surface of the coating layer.

The separator may include the heat resistant layer, and the heat resistant layer may include a heat resistant binder and second inorganic particles.

An average particle diameter of the second inorganic particles may be about 0.1 μm to about 3.0 μm.

The separator may include the adhesive layer, and the adhesive layer may include a particle-shaped (meth)acryl adhesive binder or a particle-shaped fluorine adhesive binder.

The separator may include the adhesive layer, and a thickness of the adhesive layer may be about 0.1 μm to about 1.0 μm.

The embodiments may be realized by providing a rechargeable lithium battery including a positive electrode; a negative electrode; and the separator according to an embodiment.

BRIEF DESCRIPTION OF THE DRAWINGS

Features will be apparent to those of skill in the art by describing in detail exemplary embodiments with reference to the attached drawings in which.

DETAILED DESCRIPTION

Figure 1:
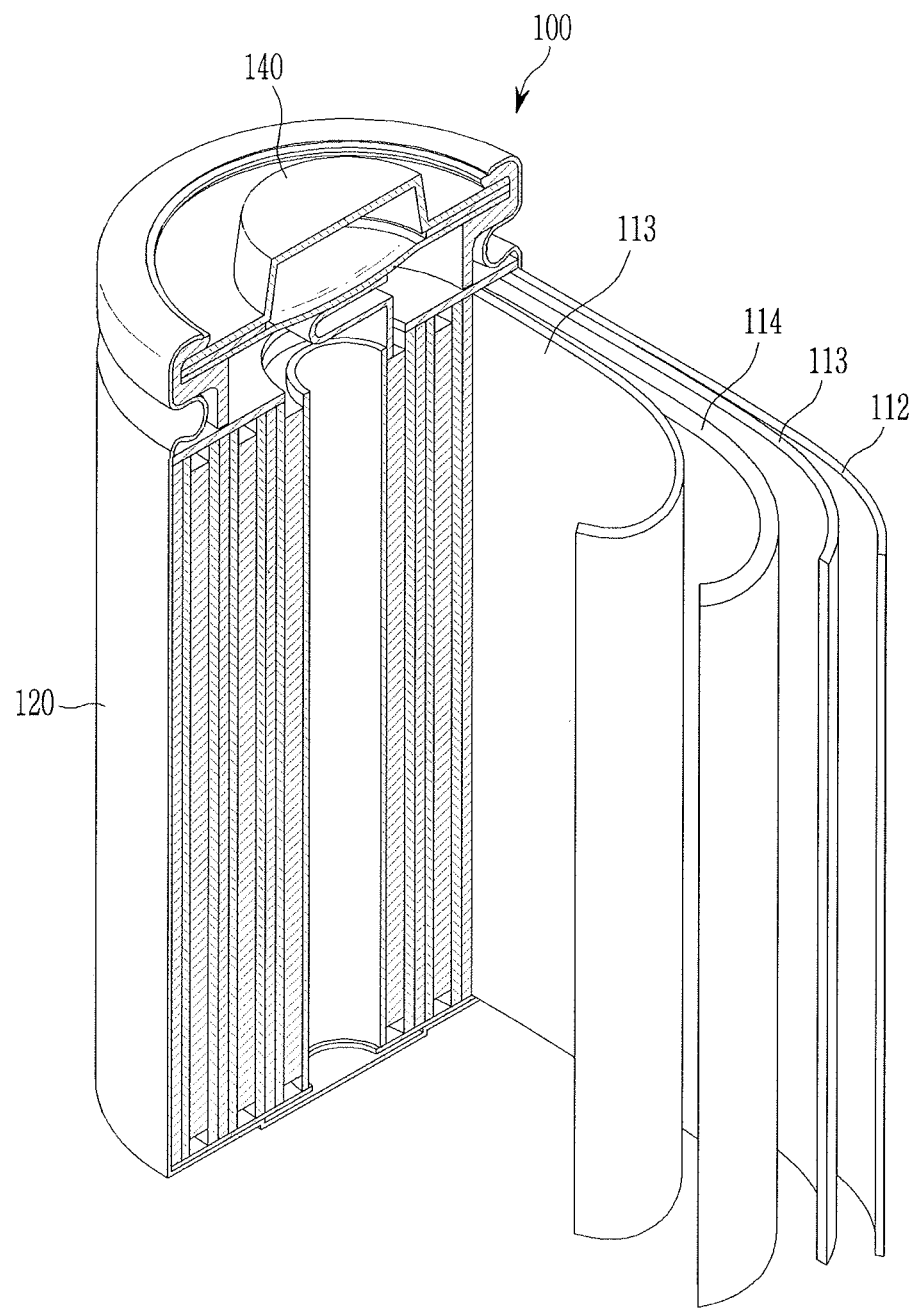
FIG. 1 illustrates an exploded perspective view of a rechargeable lithium battery according to an embodiment.

As used herein, when a definition is not otherwise provided "substituted" refers to replacement of hydrogen of a compound by a substituent selected from a halogen atom (F, Br, Cl, or I), a hydroxy group, an alkoxy group, a nitro group, a cyano group, an amino group, an azido group, an amidino group, a hydrazino group, a hydrazono group, a carbonyl group, a carbamyl group, a thiol group, an ester group, a carboxyl group or a salt thereof, a sulfonic acid group or a salt thereof, a phosphoric acid or a salt thereof, a C1 to C20 alkyl group, a C2 to C20 alkenyl group, a C2 to C20 alkynyl group, a C6 to C30 aryl group, a C7 to C30 arylalkyl group, a C1 to C4 alkoxy group, a C1 to C20 heteroalkyl group, a C3 to C20 heteroarylalkyl group, a C3 to C30 cycloalkyl group, a C3 to C15 cycloalkenyl group, a C6 to C15 cycloalkynyl group, a C2 to C20 heterocycloalkyl group, and a combination thereof.

As used herein, when a definition is not otherwise provided, "hetero" refers to one including 1 to 3 heteroatoms selected from N, O, S, and P.

As used herein, when a definition is not otherwise provided, "divalent heterocyclic group" refers to a substituted or unsubstituted C3 to C20 heterocycloalkylene group or a substituted or unsubstituted C6 to C20 heteroarylene group.

As used herein, "(meth)acryl" refers to acryl or methacryl. As used herein, the term "or" is not an exclusive term, e.g., "A or B" would include A, B, or A and B.

A separator for a rechargeable lithium battery according to an embodiment may include a porous substrate and a coating layer on one surface or both (e.g., opposite) surfaces of the porous substrate.

The coating layer may be coated on one surface of the porous substrate facing the positive electrode, one surface of the porous substrate facing the negative electrode, or both surfaces of the porous substrate.

The porous substrate may have a plurality of pores and may be a suitable porous substrate for an electrochemical device. Examples of the porous substrate may include a polymer film formed of a polymer, or a copolymer or a mixture of two or more selected from polyolefin such as polyethylene, polypropylene, and the like, a polyester such as polyethylene terephthalate, polybutylene terephthalate, and the like, polyacetal, polyamide, polyimide, polycarbonate, polyetheretherketone, polyaryletherketone, polyetherimide, polyamideimide, polybenzimidazole, polyether sulfone, a polyphenylene oxide, a cyclic olefin copolymer, polyphenylene sulfide, polyethylene naphthalate, a glass fiber, Teflon, and polytetrafluoroethylene.

The porous substrate may be, e.g., a polyolefin substrate, and the polyolefin substrate may help improve safety of a battery due to its improved shutdown function. The polyolefin substrate may be, e.g., a polyethylene single film, a polypropylene single film, a polyethylene/polypropylene double film, a polypropylene/polyethylene/polypropylene triple film, and a polyethylene/polypropylene/polyethylene triple film. In an implementation, the polyolefin resin may include a non-olefin resin in addition to an olefin resin or a copolymer of olefin and a non-olefin monomer.

The porous substrate may have a thickness of about 1 μm to about 40 μm, e.g., about 1 μm to about 30 μm, about 1 μm to about 20 μm, about 5 μm to about 15 μm, or about 5 μm to about 10 μm.

The coating layer according to an embodiment may include a (meth)acryl heat resistant binder, polyethylene particles; and first inorganic particles. The heat resistant binder may include, e.g., a (meth)acryl copolymer including a first structural unit of or derived from (meth)acrylamide (e.g., a (meth)acrylamide monomer) and a second structural unit. The second structural unit may include at least one of a structural unit derived from (meth)acrylic acid, (meth)acrylate, (meth)acrylonitrile, or a combination thereof and a structural unit derived from (meth)acrylamido sulfonic acid, (meth)acrylamido sulfonate salt, or a combination thereof. For example, the second structural unit may include a structural unit of (meth)acrylic acid, (meth)acrylate, (meth)acrylonitrile, (meth)acrylamido sulfonic acid, a (meth)acrylamido sulfonate salt, or a combination thereof.

The polyethylene particles may be polymer particles having a melting temperature of about 80° C. to about 130° C. When the polyethylene particles are applied to a porous substrate with the first inorganic particles, the polyethylene particles may not melt during common charge∩discharge in a battery, but may melt faster than a porous substrate at the melting temperature or higher when a high temperature phenomenon occurs in the battery. For example, the polyethylene particles may block pores in the porous substrate and lead a fast shutdown function and help secure safety of the rechargeable battery.

When the first inorganic particles included in the coating layer have a larger particle size than that of the polyethylene particles, the polyethylene particles may be suppressed from transformation during a hot press process, and accordingly, a separator after the coating may maintain similar air permeability to that of the porous substrate and may more effectively exhibit an induction effect of the aforementioned shutdown function after the high temperature exposure.

Figure 7:
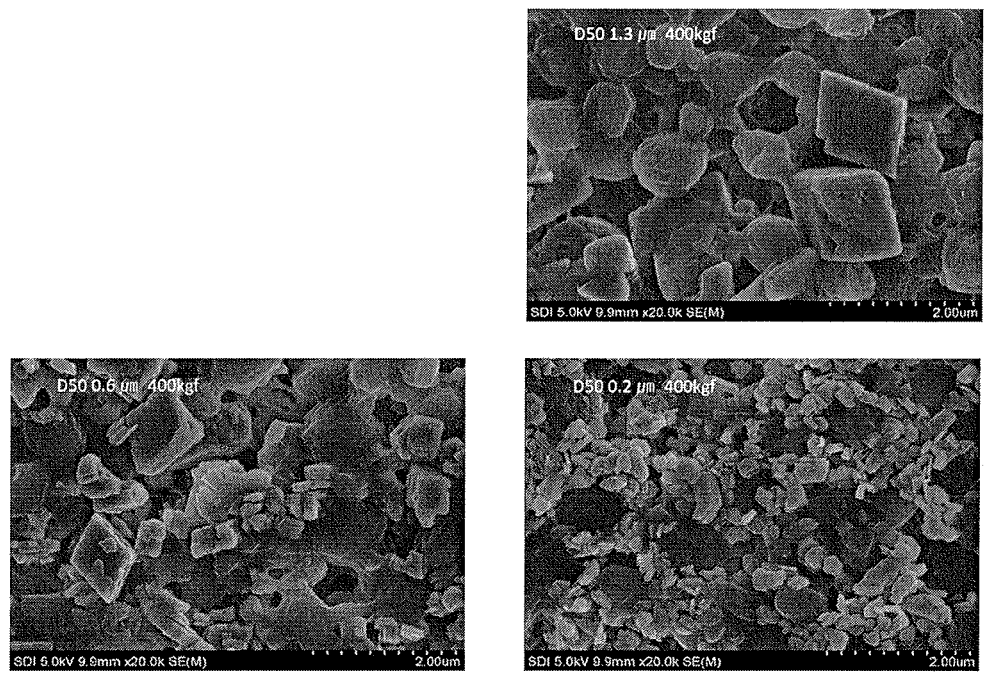
FIG. 7 illustrates SEM images after hot press processes depending on particle sizes of inorganic particles relative to particle sizes of polyethylene particles.

In this regard, FIG. 7 illustrates SEM images after the hot press process of the coating layer according to an embodiment.

FIG. 7 illustrates SEM images after hot press processes depending on particle sizes of inorganic particles relative to particle sizes of polyethylene particles.

Referring to FIG. 7, when inorganic particles have a larger average particle size of about 1.3 μm than that of the polyethylene particles, the polyethylene particles may be maintained without transformation. When the inorganic particles have an average particle size of less than about 1.3 μm, e.g., about 0.6 the polyethylene particles may be transformed. When the inorganic particles have a smaller average particle size of about 0.2 μm, this transformation may be severe.

A particle size of the first inorganic particles may be, e.g., about 1.0 μm to about 3.0 μm.

In an implementation, the particle size of the first inorganic particles may be about 1.0 μm to about 2.0 μm, e.g., about 1.0 μm to about 1.5 μm.

A particle size of the polyethylene particles may be, e.g., about 0.1 μm to about 1.0 μm.

In an implementation, the particle size of the polyethylene particles may be greater than or equal to about 0.1 μm and less than about 1.0 μm, greater than or equal to about 0.5 μm and less than about 1.0 μm, e.g., greater than or equal to about 0.7 μm and less than about 1.0 μm.

As used herein, the particle size refers to an average particle size (D50). The average particle size (D50) may be measured by a suitable method, e.g., as a particle size analyzer, or from TEM or SEM images. In an implementation, a dynamic light-scattering measurement device is used to perform a data analysis, and the number of particles is counted for each particle size range. From this, the D50 value may be obtained through a calculation.

In an implementation, the polyethylene particles may be hydrophobic, and, when dispersed among the first inorganic particles, the polyethylene particles may help reduce a moisture rate and accordingly, minimize a side reaction due to the moisture inside a battery and thus help prevent performance deterioration of the battery.

A weight ratio of the first inorganic particles and the polyethylene particles may be about 50:50 to about 1:99.

In an implementation, the first inorganic particles and the polyethylene particles may be included in a weight ratio of, e.g., about 50:50 to about 5:95. In an implementation, the polyethylene particles may be included in a greater amount by weight, than that of the first inorganic particles.

The heat resistant binder may include, e.g., a (meth)acryl copolymer including a first structural unit derived from (meth)acrylamide, a second structural unit including at least one of a structural unit derived from (meth)acrylic acid, (meth)acrylate, (meth)acrylonitrile, or a combination thereof and a structural unit derived from (meth)acrylamido sulfonic acid, a (meth)acrylamido sulfonate salt, or a combination thereof.

The first structural unit derived from (meth)acrylamide may include an amide functional group (—C(=O)NH$_2$) in the structural unit. The —C(=O)NH$_2$ functional group may help improve adherence characteristics with a porous substrate and an electrode, may form a hydrogen bond with an —OH functional group of the first inorganic particles described later and thus may more firmly fix the first inorganic particles in a coating layer and accordingly, may strengthen heat resistance of a separator.

The structural unit derived from (meth)acrylic acid, (meth)acrylate, (meth)acrylonitrile, or a combination thereof and included in the second structural unit may play a role of fixing the polyethylene particles and the first inorganic particles on the porous substrate and simultaneously, may provide adherence, so that a coating layer may be well adhered to the porous substrate and the electrode and accordingly, may contribute to improving heat resistance and air permeability of the separator. In addition, the structural unit may include a carboxyl functional group (—C(=O)O—) and thus may contribute to improving dispersion of coating slurry and in addition, may include a nitrile group and thus may help improve oxidation resistance of the separator and may help reduce a moisture content thereof.

In addition, the structural unit derived from (meth)acrylamido sulfonic acid, a (meth)acrylamido sulfonate salt, or a combination thereof and included in the second structural unit may include a bulky functional group and thus may help reduce mobility of a copolymer including the same and resultantly, may help strengthen heat resistance of the separator.

The heat resistant binder may further improve heat resistance by including the (meth)acryl copolymer having a glass transition temperature (Tg) of greater than or equal to about 150° C., and may be included in the coating layer together with the aforementioned first inorganic particles and polyethylene particles to exhibit excellent heat resistance and air permeability of the separator for a rechargeable lithium battery.

The coating layer may include the heat resistant binder: the first inorganic particles and polyethylene particles in a weight ratio of about 1:20 to about 1:40, e.g., about 1:25 to about 1:40, or 1:25 to about 1:35. When the (meth)acryl heat resistant binder, and the first inorganic particles and polyethylene particles are included in the ranges, the separator may exhibit excellent heat resistance and air permeability.

The structural unit derived from (meth)acrylic acid, (meth)acrylate, (meth)acrylonitrile, or the combination thereof of the second structural unit may be included in an amount of about 0 mol % to about 40 mol %, e.g., about 0 mol % to about 30 mol %, greater than or equal to about 0 mol %, greater than or equal to about 5 mol %, greater than or equal to about 10 mol %, or greater than or equal to about 20 mol % and less than or equal to about 30 mol %, less than or equal to about 20 mol %, or less than or equal to about 10 mol % based on 100 mol % of the (meth)acryl copolymer.

The structural unit derived from (meth)acrylamido sulfonic acid, (meth)acrylamido sulfonate salt, or the combination thereof may be included in an amount of about 0 mol % to about 10 mol %, e.g., greater than or equal to about 1 mol % or greater than or equal to about 2 mol % and less than or equal to about 10 mol %, or less than or equal to about 9 mol % based on 100 mol % of the (meth)acryl copolymer.

For example, the first structural unit may be included in an amount of about 55 mol % to about 95 mol % based on 100 mol % of the (meth)acryl copolymer and the second structural unit may be included in an amount of about 5 mol % to about 45 mol % based on 100 mol % of the (meth)acryl copolymer.

For example, the first structural unit may be included in an amount of about 90 mol % to about 95 mol % based on 100 mol % of the (meth)acryl copolymer and the second structural unit may be included in an amount of about 5 mol % to about 10 mol % based on 100 mol % of the (meth)acryl copolymer.

When the amounts of each structural unit are within the ranges, heat resistance of the separator may be further improved.

The first structural unit derived from (meth)acrylamide may be, e.g., represented by Chemical Formula 1.

[Chemical Formula 1]

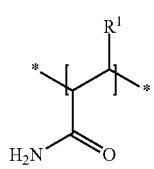

In Chemical Formula 1, $R^1$ may be, e.g., hydrogen or a C1 to C6 alkyl group.

The structural unit derived from (meth)acrylic acid, (meth)acrylate, (meth)acrylonitrile, or the combination thereof may be, e.g., represented by one of Chemical Formula 2, Chemical Formula 3, Chemical Formula 4, and a combination thereof.

[Chemical Formula 2]

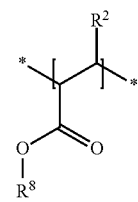

[Chemical Formula 3]

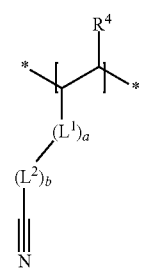

[Chemical Formula 4]

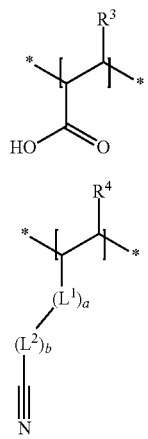

In Chemical Formula 2 to Chemical Formula 4, $R^2$ to $R^4$ may each independently be, e.g., hydrogen or a C1 to C6 alkyl group, $R^8$ may be or may include, e.g., a substituted or unsubstituted C1 to C20 alkyl group, $L^1$ may be, e.g., —C(=O)—, —C(=O)O—, —OC(=O)—, —O—, or —C(=O)NH—, $L^2$ may be or may include, e.g., a substituted or unsubstituted C1 to C10 alkylene group, a substituted or unsubstituted C3 to C20 cycloalkylene group, a substituted or unsubstituted C6 to C20 arylene group, or a substituted or unsubstituted C3 to C20 divalent heterocyclic group, and a and b may each independently be, e.g., an integer of 0 to 2.

The structural unit derived from the (meth)acrylate may be derived from (meth)acrylic acid alkyl ester, (meth)acrylic acid perfluoroalkyl ester, and (meth)acrylate having a functional group at the side chain, e.g., (meth)acrylic acid alkyl ester. In an implementation, the carbon number of an alkyl group or a perfluoroalkyl group bound to the non-carbonyl oxygen atom of the (meth)acrylic acid alkyl ester or (meth)acrylic acid perfluoroalkyl ester may be, e.g., 1 to 20, 1 to 10, or 1 to 5.

Examples of the (meth)acrylic acid alkyl ester in which the carbon number of an alkyl group or a perfluoroalkyl group bound to the non-carbonyl oxygen atom is 1 to 5 may include acrylic acid alkyl ester such as methyl acrylate, ethyl acrylate, n-propyl acrylate, isopropyl acrylate, n-butyl acrylate, and t-butyl acrylate, and the like; 2-(perfluoroalkyl) ethyl acrylate such as 2-(perfluorobutyl) ethyl acrylate, 2-(perfluoropentyl) ethyl acrylate, and the like; methacrylic acid alkyl ester such as methyl methacrylate, ethyl methacrylate, n-propyl methacrylate, isopropyl methacrylate, n-butyl methacrylate, and t-butyl methacrylate, and the like; and 2-(perfluoroalkyl) ethyl methacrylate such as 2-(perfluorobutyl) ethyl methacrylate, 2-(perfluoropentyl) ethyl methacrylate, 2-(perfluoroalkyl) ethyl methacrylate, and the like.

Other (meth)acrylic acid alkyl esters may include acrylic acid alkyl ester in which the carbon number of the alkyl group bound to the non-carbonyl oxygen atom is 6 to 18 such as n-hexyl acrylate, 2-ethylhexyl acrylate, nonyl acrylate, lauryl acrylate, stearyl acrylate, cyclohexyl acrylate, and isobornyl acrylate, and the like; methacrylic acid alkyl ester in which the carbon number of the alkyl group bound to the non-carbonyl oxygen atom is 6 to 18 such as n-hexyl methacrylate, 2-ethylhexyl methacrylate, octyl methacrylate, isodecyl methacrylate, lauryl methacrylate, tridecyl methacrylate, stearyl methacrylate, and cyclohexyl methacrylate; 2-(perfluoroalkyl) ethyl acrylate in which the carbon number of the perfluoroalkyl group bound to the non-carbonyl oxygen atom is 6 to 18 such as 2-(perfluorohexyl) ethyl acrylate, 2-(perfluorooctyl) ethyl acrylate, 2-(perfluorononyl) ethyl acrylate, 2-(perfluorodecyl) ethyl acrylate, 2-(perfluorododecyl) ethyl acrylate, 2-(perfluorotetradecyl) ethyl acrylate, 2-(perfluorohexadecyl) ethyl acrylate, and the like; 2-(perfluoroalkyl) ethyl methacrylate in which the carbon number of the perfluoroalkyl group bound to the non-carbonyl oxygen atom is 6 to 18 such as 2-(perfluorohexyl) ethyl methacrylate, 2-(perfluorooctyl) ethyl methacrylate, 2-(perfluorononyl) ethyl methacrylate, 2-(perfluorodecyl) ethyl methacrylate, 2-(perfluorododecyl) ethyl methacrylate, 2-(perfluorotetradecyl) ethyl methacrylate, 2-(perfluorohexadecyl) ethyl methacrylate and the like.

In an implementation, the structural unit derived from (meth)acrylic acid or (meth)acrylate may include a structural unit represented by Chemical Formula 2 and a structural unit represented by Chemical Formula 3 respectively or both of them together, and when the structural units are included together, the structural units represented by Chemical Formulae 2 and 3 may be included in a mole ratio of about 10:1 to about 1:1, e.g., about 6:1 to about 1:1, or about 3:1 to about 1:1.

In an implementation, the structural unit derived from the (meth) acrylonitrile may be, e.g., a structural unit derived from (meth) acrylonitrile or cyanoalkyl (meth) acrylate. In an implementation, the alkyl may be, e.g., C1 to C20 alkyl, C1 to C10 alkyl, or C1 to C6 alkyl.

The cyanoalkyl(meth)acrylate may be for example cyanomethyl(meth)acrylate, cyanoethyl(meth)acrylate, cyanopropyl(meth)acrylate, or cyanooctyl(meth)acrylate.

The structural unit derived from (meth)acrylamido sulfonic acid, (meth)acrylamido sulfonate salt, or the combination thereof may be, e.g., represented by one of Chemical Formula 5, Chemical Formula 6, Chemical Formula 7, and a combination thereof.

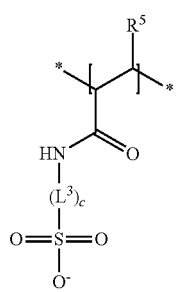

[Chemical Formula 5]

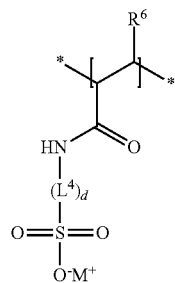

[Chemical Formula 6]

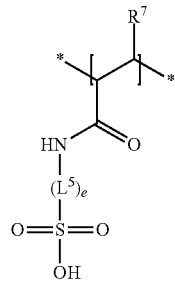

[Chemical Formula 7]

In Chemical Formula 5 to Chemical Formula 7, $R^5$, $R^6$, and $R^7$ may each independently be, e.g., hydrogen or a C1 to C6 alkyl group, $L^3$, $L^4$, and $L^5$ may each independently be or include, e.g., a substituted or unsubstituted C1 to C10 alkylene group, a substituted or unsubstituted C3 to C20 cycloalkylene group, a substituted or unsubstituted C6 to C20 arylene group, or a substituted or unsubstituted C3 to C20 divalent heterocyclic group, c, d, and e may each independently be, e.g., an integer of 0 to 2, M may be, e.g., an alkali metal such as lithium, sodium, potassium, rubidium, or cesium.

In an implementation, in Chemical Formula 5 to Chemical Formula 7, $L^3$, $L^4$, and $L^5$ may each independently be or include, e.g., a substituted or unsubstituted C1 to C10 alkylene group, and c, d, and e may each be 1.

The structural unit derived from the (meth) acrylamido sulfonic acid and a salt thereof may include the structural unit represented by Chemical Formula 5, the structural unit represented by Chemical Formula 6, and the structural unit represented by Chemical Formula 7, respectively or two or more thereof. In an implementation, the structural unit represented by Chemical Formula 6 may be included. In an implementation, the structural unit represented by Chemical Formula 6 and the structural unit represented by Chemical Formula 7 may be included.

When the structural unit represented by Chemical Formula 6 and the structural unit represented by Chemical Formula 7 are included together, the structural unit represented by Chemical Formula 6 and the structural unit represented by Chemical Formula 7 may be included in a molar ratio of, e.g., about 10:1 to about 1:2, about 5:1 to about 1:1, or about 3:1 to about 1:1.

The structural unit derived from (meth)acrylamido sulfonic acid or a salt thereof may be a structural unit derived from (meth)acrylamido sulfonic acid or (meth)acrylamido sulfonate, wherein the (meth)acrylamido sulfonate may be a conjugate base of the (meth)acrylamido sulfonic acid, (meth)acrylamido sulfonate salt, or a derivative thereof.

A sulfonate group in the structural unit derived from (meth)acrylamido sulfonic acid or a salt thereof may be, e.g., a functional group derived from vinyl sulfonic acid, allyl sulfonic acid, styrene sulfonic acid, anethole sulfonic acid, acrylamidoalkane sulfonic acid, sulfoalkyl (meth)acrylate, or a salt thereof.

In an implementation, the alkane may be C1 to C20 alkane, C1 to C10 alkane, or C1 to C6 alkane and the alkyl may be C1 to C20 alkyl, C1 to C10 alkyl, or C1 to C6 alkyl. The salt refers to a salt consisting of or including the sulfonic acid and an appropriate ion. The ion may be, e.g., an alkali metal ion and in this case, the salt may be an alkali metal sulfonate salt.

In an implementation, the acryl amidoalkane sulfonic acid may be, e.g., 2-acrylamido-2-methylpropane sulfonic acid and the sulfoalkyl (meth)acrylate may be, e.g., 2-sulfoethyl (meth)acrylate, 3-sulfopropyl (meth)acrylate, and the like.

In an implementation, the (meth)acryl copolymer may be, e.g., represented by Chemical Formula 8 or Chemical Formula 9.

[Chemical Formula 8]

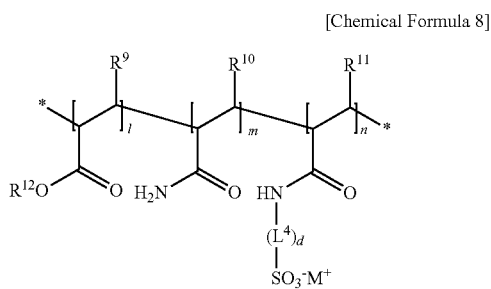

In Chemical Formula 8, $R^9$ to $R^{11}$ may each independently be, e.g., hydrogen or a methyl group, $R^{12}$ is hydrogen or a C1 to C6 alkyl group, $L^4$ may be or may include, e.g., a substituted or unsubstituted C1 to C10 alkylene group, a substituted or unsubstituted C3 to C20 cycloalkylene group, a substituted or unsubstituted C6 to C20 arylene group, or a substituted or unsubstituted C3 to C20 divalent heterocyclic group, d may be, e.g., an integer of 0 to 2, M is a counter ion and may be, e.g., lithium, sodium, potassium, rubidium, or cesium, and l, m, and n indicates a mole ratio of each unit.

[Chemical Formula 9]

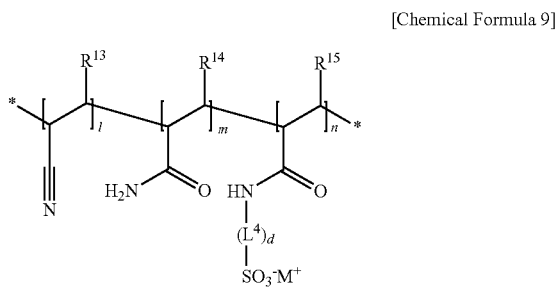

In Chemical Formula 9, $R^{13}$ to $R^{15}$ may each independently be, e.g., hydrogen or a methyl group, $L^4$ may be or may include, e.g., a substituted or unsubstituted C1 to C10 alkylene group, a substituted or unsubstituted C3 to C20 cycloalkylene group, a substituted or unsubstituted C6 to C20 arylene group, or a substituted or unsubstituted C3 to C20 divalent heterocyclic group, d may be, e.g., an integer of 0 to 2, M may be, e.g., lithium, sodium, potassium, rubidium, or cesium, and l, m, and n indicate a mole ratio of each unit.

In an implementation, in Chemical Formula 8 and Chemical Formula 9, 1+m+n may be 1. In an implementation, l, m, and n may satisfy 0.05≤(l+n)<0.45, 0.55≤m≤0.95, specifically 0≤l≤0.40 and 0.05≤n≤0.40, e.g. 0.80≤m≤0.95, 0≤l≤0.15 and 0.05≤n≤0.1.

In an implementation, in Chemical Formula 8 and Chemical Formula 9, $L^4$ may be or may include, e.g., a substituted or unsubstituted C1 to C10 alkylene group and d may be 1.

In the (meth)acryl copolymer, the structural unit substituted with the alkali metal ($M^+$) may be about 50 mol % to about 100 mol %, e.g. about 60 mol % to about 90 mol % or about 70 mol % to about 90 mol % based on a total amount, 100 mol %, of the (meth)acrylamido sulfonic acid structural unit. When the substituted degree of the alkali metal satisfies the ranges, the (meth) acryl copolymer and the separator including the same may exhibit improved adherence, heat resistance, and oxidation resistance.

In an implementation, the (meth)acryl copolymer may further include other structural units in addition to the structural units described above. In an implementation, the (meth)acryl copolymer may further include, e.g. a unit derived from alkyl(meth)acrylate, a unit derived from a diene-based monomer, a unit derived from a styrene-based monomer, an ester group-containing unit, a carbonate group-containing unit, or a combination thereof.

In an implementation, the (meth)acryl copolymer may have various forms, e.g., an alternate polymer where the units are alternately distributed, a random polymer the units are randomly distributed, or a graft polymer where a part of structural unit is grafted.

A weight average molecular weight of the (meth)acryl copolymer may be about 200,000 g/mol to about 700,000 g/mol, e.g., about 300,000 g/mol to about 600,000 g/mol, about 350,000 g/mol to about 550,000 g/mol, or about 400,000 g/mol to about 500,000 g/mol. When the weight average molecular weight of the (meth)acryl copolymer satisfies the ranges, the (meth)acryl copolymer and the separator including the same may exhibit excellent adherence, heat resistance, and air permeability. The weight average molecular weight may be polystyrene-reduced average molecular weight measured by gel permeation chromatography.

The (meth)acryl copolymer may be prepared by various suitable methods such as emulsion polymerization, suspension polymerization, massive polymerization, solution polymerization, or bulk polymerization.

The coating layer may have a thickness of about 1 μm to about 5 μm, e.g., about 1.5 μm to about 3 μm.

A ratio of the thickness of the coating layer relative to the thickness of the porous substrate may be about 0.05 to about 0.5, e.g., about 0.05 to about 0.4, about 0.05 to about 0.3, or about 0.1 to about 0.2. In this case, the separator including the porous substrate and the coating layer may exhibit improved air permeability, heat resistance, and adherence.

The separator for a rechargeable lithium battery according to an embodiment may further include, e.g., a heat resistant layer or an adhesive layer, in addition to the aforementioned coating layer.

In an implementation, the heat resistant layer may be one surface of the porous substrate, and the coating layer may be on the other surface of the porous substrate or on a surface of the heat resistant layer (e.g., the heat resistant layer may be between the porous substrate and the coating layer).

In an implementation, the adhesive layer may be on one surface of the porous substrate, one surface of the heat resistant layer, or one surface of the coating layer.

Figure 2:
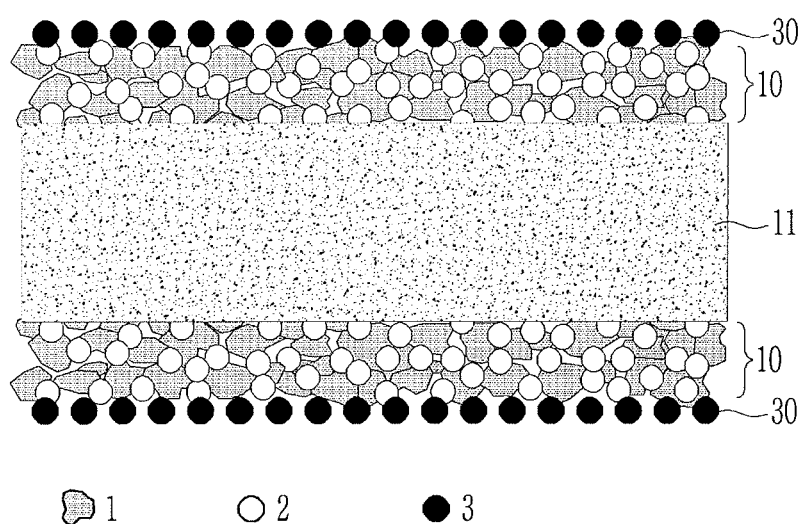
FIG. 2 illustrates a schematic view of a separator according to an embodiment.
Figure 3:
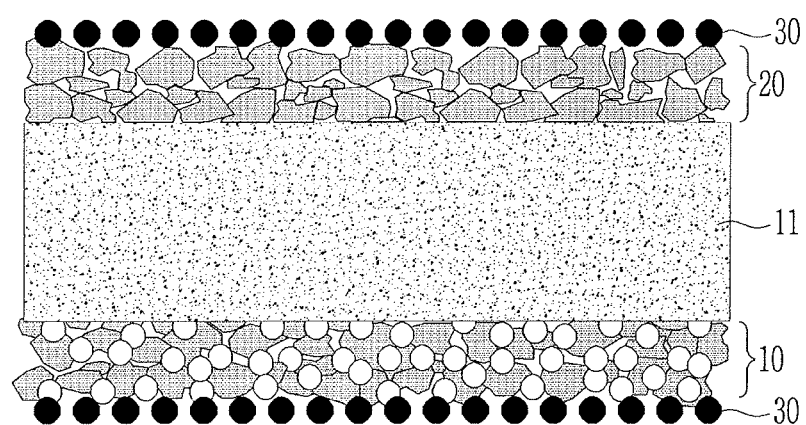
FIG. 3 illustrates a schematic view of a separator according to another embodiment.
Figure 4:
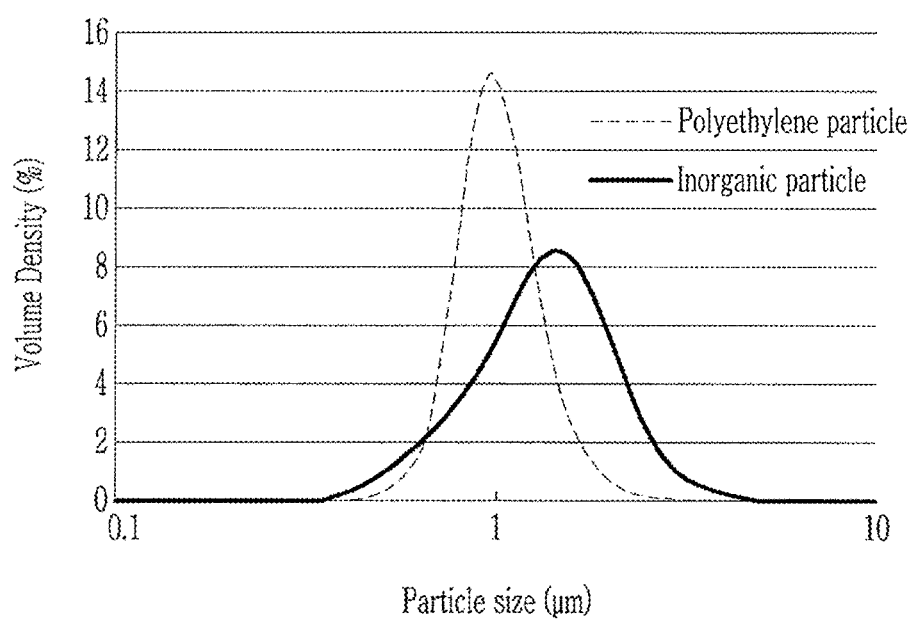
FIG. 4 illustrates a graph showing a volume distribution weighted particle distribution curve depending on particle diameters of inorganic particles and polyethylene particles in the composition for forming a coating layer of a separator according to an embodiment.

In this regard, FIGS. 2 and 3 illustrate schematic views of examples of separators further including the heat resistant layer and/or adhesive layer.

Referring to FIG. 2, the coating layers 10 may be on both surfaces of the porous substrate 11, and adhesive layers 30 may be on one (e.g., outer surface) surface of the coating layer 10. For example, the coating layers 10 may include the first inorganic particles 1 and the polyethylene particles 2, and the adhesive layers 30 may include the adhesive binder 3.

Referring to FIG. 3, the heat resistant layer 20 may be on one surface of the porous substrate 11, the coating layer 10 may be on the other surface of the porous substrate 11, and the adhesive layers 30 may be on one (e.g., outer) surface of the heat resistant layer 20 and one (e.g., outer) surface of the coating layer 10.

The heat resistant layer 20 may include a heat resistant binder (not shown) and second inorganic particles 1.

The heat resistant binder may include at least one of a cross-linkable binder and a non-cross-linkable binder.

The cross-linkable binder may be obtained from a monomer, an oligomer, and/or a polymer having a curable functional group capable of reacting with heat and/or light, e.g., a multi-functional monomer, a multi-functional oligomer, and/or a multi-functional polymer having at least two curable functional groups. In an implementation, the curable functional group may include, e.g., a vinyl group, a (meth) acrylate group, an epoxy group, an oxetane group, an ether group, a cyanate group, an isocyanate group, a hydroxy group, a carboxyl group, a thiol group, an amino group, an alkoxy group, of a combination thereof.

The cross-linkable binder may be obtained from a monomer, an oligomer and/or a polymer including at least two (meth)acrylate groups, e.g., ethylene glycol di(meth)acrylate, propylene glycol di(meth)acrylate, polyethylene glycol di(meth)acrylate, polypropylene glycol di(meth)acrylate, butanediol di(meth)acrylate, hexamethylene glycol di(meth) acrylate, trimethylolpropane tri(meth)acrylate, glycerine tri (meth)acrylate, pentaerythritol tetra(meth)acrylate, diglycerine hexa(meth)acrylate, or a combination thereof.

In an implementation, the cross-linkable binder may be obtained from a monomer, an oligomer and/or a polymer including at least two epoxy groups, e.g., bisphenol A diglycidyl ether, bisphenol F diglycidyl ether, hexahydrophthalic acid glycidyl ester, or a combination thereof.

In an implementation, the cross-linkable binder may be obtained from a monomer, an oligomer and/or a polymer including at least two isocyanate groups, e.g., diphenylmethane diisocyanate, 1,6-hexamethylene diisocyanate, 2,2,4(2, 2,4)-trimethyl hexamethylene diisocyanate, phenylene diisocyanate, 4,4'-dicyclohexylmethane diisocyanate, 3,3'-dimethyldiphenyl-4,4'-diisocyanate, xylene diisocyanate, naphthalene diisocyanate, 1,4-cyclohexyl diisocyanate, or a combination thereof.

In an implementation, the non-cross-linkable binder may be, e.g., a vinylidene fluoride-based polymer, polymethylmethacrylate, polyacrylonitrile, polyvinylpyrrolidone, polyvinylacetate, a polyethylene-vinylacetate copolymer, polyethylene oxide, cellulose acetate, cellulose acetate butyrate, cellulose acetate propionate, cyanoethyl pullulan, cyanoethyl polyvinyl alcohol, cyanoethyl cellulose, cyanoethyl sucrose, pullulan, carboxylmethyl cellulose, an acrylonitrile-styrene-butadiene copolymer, or a combination thereof.

In an implementation, the vinylidene fluoride-based polymer may be, e.g., a homopolymer including only vinylidene fluoride monomer-derived unit or a copolymer of a vinylidene fluoride-derived unit and other monomer-derived unit. In an implementation, the copolymer may include, e.g., a vinylidene fluoride-derived unit and at least one of units derived from chlorotrifluoroethylene, trifluoroethylene, hexafluoropropylene, ethylene tetrafluoride and ethylene monomers. In an implementation, the copolymer may be a polyvinylidene fluoride-hexafluoropropylene (PVdF-HFP) copolymer including a vinylidene fluoride monomer-derived unit and a hexafluoropropylene monomer-derived unit.

In an implementation, the non-cross-linkable binder may be a polyvinylidene fluoride (PVdF) homopolymer, a polyvinylidene fluoride-hexafluoropropylene (PVdF-HFP) copolymer, or a combination thereof.

In an implementation, the second inorganic particles may have a particle size ranging from about 0.1 μm to about 3.0 μm, e.g., about 0.5 μm to about 2.0 μm, or about 0.5 μm to about 1.5 μm.

The heat resistant layer may include the heat resistant binder: the second inorganic particles in a weight ratio of about 1:20 to about 1:40, e.g., about 1:25 to about 1:40, and more specifically, about 1:25 to about 1:35. When the heat resistant binder and the second inorganic particles are within the ranges, heat resistance of the separator may be further improved.

The adhesive layer may include a particle-shaped (meth) acryl adhesive binder or a particle-shaped fluorine adhesive binder.

In an implementation, the separator may further include, e.g., the adhesive layer and may help prevent possible deformation of a battery during the charge and discharge and thus improve capacity decrease and safety problem thereof.

The particle-shaped (meth)acryl adhesive binder may have a core-shell structure, e.g., may be a (meth)acryl-based polymer including a structural unit derived from (meth) acrylic acid or (meth)acrylate and a structural unit derived from a monomer including a polymerizable unsaturated group.

In an implementation, a core of the (meth)acryl adhesive binder may include the structural unit derived from (meth) acrylic acid or (meth)acrylate, and a shell of the (meth)acryl adhesive binder may include the structural unit derived from a monomer including a polymerizable unsaturated group.

The structural unit derived from the (meth)acrylic acid or the (meth)acrylate included in the core of the (meth)acryl adhesive binder may be, e.g., represented by one of Chemical Formula 2, Chemical Formula 3, and a combination thereof, like in the aforementioned (meth)acryl heat resistant binder.

The monomer including the polymerizable unsaturated group included in the shell of the (meth)acryl adhesive binder may be at least one selected from a styrene monomer, an acid-derived monomer, and a combination thereof.

In an implementation, the styrene monomer may include at least one aromatic vinyl monomer represented by Chemical Formula 10.

[Chemical Formula 10]

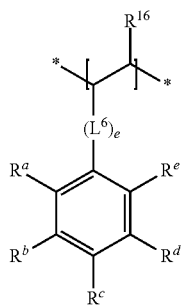

In Chemical Formula 10, $R^{16}$ may be, e.g., hydrogen or a C1 to C6 alkyl group, $R^a$ to $R^e$ may each independently be, e.g., hydrogen or a C1 to C6 alkyl group, $L^6$ may be or may include, e.g., a substituted or unsubstituted C1 to C10 alkylene group, a substituted or unsubstituted C3 to C20 cycloalkylene group, a substituted or unsubstituted C6 to C20 arylene group, or a substituted or unsubstituted C3 to C20 divalent heterocyclic group, e may be, e.g., an integer of 0 to 2, and

* is a linking point.

In an implementation, the styrene monomer may include, e.g., methyl styrene, bromo styrene, chloro styrene, or styrene.

In an implementation, the acid-derived monomer includes a substituent corresponding to —COOH and may include, e.g., itaconic acid, (meth)acrylic acid, and a combination thereof.

In an implementation, the (meth)acryl adhesive binder may be cross-linkable or non cross-linkable. In order to prepare a cross-linkable (meth)acryl polymer, a cross-linking agent may be further added in the polymerization.

The (meth)acryl adhesive binder may have a glass transition temperature of greater than or equal to about 50° C. and less than or equal to about 110° C., when the glass transition temperature exists.

Within the range, satisfactory ion conductivity as well as excellent electrode adherence may be obtained.

The (meth)acryl adhesive binder may have a particle size of about 0.2 μm to about 1.0 μm, about 0.2 μm to about 0.7 μm, about 0.3 μm to about 0.7 μm, or about 0.4 μm to about 0.7 μm. The particle diameter may be adjusted by controlling an initiator addition amount, an emulsifier addition amount, a reaction temperature, an agitation speed, and the like.

The particle-shaped fluorine adhesive binder may include a polyvinylidene fluoride (PVdF) homopolymer or a copolymer of vinylidenefluoride with a different monomer therefrom.

The different monomer copolymerized with the vinylidenefluoride and forming the copolymer may include, e.g., chlorotrifluoroethylene, trifluoroethylene, hexafluoropropylene, ethylene tetrafluoride, or an ethylene monomer. For example, the copolymer may be a polyvinylidene fluoride-hexafluoropropylene (PVdF-HFP) copolymer including a unit derived from a vinylidenefluoride monomer and a unit derived from a hexafluoropropylene monomer.

The particle-shaped fluorine adhesive binder may have a weight average molecular weight ranging from about 100,000 g/mol to about 1,500,000 g/mol, e.g., from about 300,000 g/mol to about 800,000 g/mol. When the particle-shaped fluorine adhesive binder has a weight average molecular weight within the range, the particle-shaped fluorine adhesive binder and the separator including the same may exhibit excellent adherence, heat resistance, air permeability, and oxidation resistance.

The weight average molecular weight may be polystyrene-reduced average molecular weight measured by gel permeation chromatography.

The particle-type fluorine adhesive binder may have a glass transition temperature of about −45° C. to about −35° C., e.g., about −42° C. to about −38° C. and a melting point of about 100° C. to about 180° C., e.g., about 130° C. to about 160° C. When the particle-type fluorine adhesive binder satisfies each glass transition temperature and melting point range, the particle-type fluorine adhesive binder and a separator including the same may exhibit excellent adherence, heat resistance, air permeability, and oxidation resistance. The glass transition temperature may be measured in a differential scanning calorimetry (DSC) method.

The particle-type fluorine adhesive binder may have a particle size of about 100 nm to about 500 nm, e.g., about 150 nm to about 300 nm.

The particle diameter may be adjusted by controlling an initiator addition amount, an emulsifier addition amount, a reaction temperature, an agitation speed, and the like.

The adhesive binder may be included in an amount of about 1 to about 20 wt %, e.g., about 5 to about 20 wt %, or about 5 to about 15 wt % based on a total amount of the coating layer.

Maintaining the amount of the adhesive binder at about 1 wt % or greater may help ensure that electrode adherence is realized. Maintaining the amount of the adhesive binder at about 20 wt % or less may help ensure that capacity is not limitedly realized due to a battery resistance increase.

The adhesive layer may have a thickness of about 0.1 μm to about 1.0 μm. When the adhesive layer has a thickness within the range, adherence may be strengthened, and thus deformation of a battery may be more effectively prevented.

In an implementation, the coating layer, the heat resistant layer, or the adhesive layer may further include a binder to strengthen a bonding force with the substrate.

In an implementation, the coating layer may further include at least one of a cross-linkable binder and a non cross-linkable binder in addition to the heat resistant binder.

The cross-linkable binder and the non cross-linkable binder may be the same as described with reference to the aforementioned heat resistant binder.

The first inorganic particles and the second inorganic particles may help prevent a separator from being sharply shrunk due to a temperature increase. In an implementation, the first inorganic particles and the second inorganic particles may be a ceramic material capable of improving heat resistance, e.g., $Al_2O_3$, $SiO_2$, $TiO_2$, $SnO_2$, $CeO_2$, MgO, NiO, CaO, GaO, ZnO, $ZrO_2$, $Y_2O_3$, $SrTiO_3$, $BaTiO_3$, $Mg(OH)_2$, boehmite, or a combination thereof. The inorganic particle may have a spherical shape, a sheet shape, a cubic shape, or an amorphous shape.

The particle size of the inorganic particles may be particle size ($D_{50}$) at a volume ratio of 50% in a cumulative size-distribution curve. By using the inorganic particle having the particle size within the ranges, the coating layer may have an appropriate strength, and the separator may have improved heat resistance, durability, and stability.

The separator for a rechargeable battery according to an embodiment may be manufactured by suitable methods. For example, the separator for a rechargeable battery may be formed by coating a composition for forming a coating layer and drying the same on one surface or both surfaces of the porous substrate.

The composition for forming a coating layer may include the aforementioned (meth)acryl copolymer, the first inorganic particles, the polyethylene particles, and a solvent. The solvent may be a suitable solvent that dissolves or disperses the (meth)acryl copolymer, the first inorganic particles, and the polyethylene particles. In an implementation, the solvent may be an aqueous solvent including water, an alcohol, or a combination thereof, which is environmentally-friendly.

In an implementation, the coating may be, e.g., a spin coating, a dip coating, a bar coating, a die coating, a slit coating, a roll coating, an inkjet printing, or the like.

In an implementation, the drying may be, e.g., performed through natural drying, drying with warm air, hot air, or low humid air, vacuum-drying, or irradiation of a far-infrared ray, an electron beam, and the like. The drying may be, e.g., performed at a temperature of about 25° C. to about 120° C.

The separator for a rechargeable lithium battery may be manufactured by lamination, coextrusion, and the like in addition to the above method.

Hereinafter, a rechargeable lithium battery including the aforementioned separator for the rechargeable lithium battery is described.

A rechargeable lithium battery may be classified into a lithium ion battery, a lithium ion polymer battery, and a lithium polymer battery depending on kinds of a separator and an electrolyte. It also may be classified to be cylindrical, prismatic, coin-type, pouch-type, and the like depending on shapes. In addition, it may be bulk type and thin film type depending on sizes.

Herein, as an example of a rechargeable lithium battery, a cylindrical rechargeable lithium battery is for example described. FIG. 1 illustrates an exploded perspective view of a rechargeable lithium battery according to an embodiment. Referring to FIG. 1, a rechargeable lithium battery 100 according to an embodiment may include a battery cell including a negative electrode 112, a positive electrode 114 facing the negative electrode 112, a separator 113 between the negative electrode 112 and the positive electrode 114, and an electrolyte solution immersed in the negative electrode 112, positive electrode 114 and separator 113, a battery case 120 housing the battery cell, and a sealing member 140 sealing the battery case 120.

The positive electrode 114 may include a positive current collector and a positive active material layer formed on the positive current collector. The positive active material layer may include a positive active material, a binder, and optionally a conductive material.

In an implementation, the positive current collector may use, e.g., aluminum, nickel, or the like.

The positive active material may use a compound being capable of intercalating and deintercalating lithium. In an implementation, at least one of a composite oxide or a composite phosphate of a metal selected from cobalt, manganese, nickel, aluminum, iron, or a combination thereof and lithium may be used. In an implementation, the positive active material may be a lithium cobalt oxide, a lithium nickel oxide, a lithium manganese oxide, a lithium nickel cobalt manganese oxide, a lithium nickel cobalt aluminum oxide, a lithium iron phosphate, or a combination thereof.

In an implementation, the binder may help improve binding properties of positive active material particles with one another and with a current collector, and examples may include polyvinyl alcohol, carboxylmethyl cellulose, hydroxypropyl cellulose, diacetyl cellulose, polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, and the like. These may be used alone or as a mixture of two or more.

The conductive material may help improve conductivity of an electrode. Examples thereof may include natural graphite, artificial graphite, carbon black, a carbon fiber, a metal powder, a metal fiber, and the like. These may be used alone or as a mixture of two or more. The metal powder and the metal fiber may use a metal of copper, nickel, aluminum, silver, and the like.

The negative electrode 112 may include a negative current collector and a negative active material layer formed on the negative current collector.

In an implementation, the negative current collector may use, e.g., copper, gold, nickel, a copper alloy, or the like.

The negative active material layer may include, e.g., a negative active material, a binder, and optionally a conductive material. The negative active material may be a material that reversibly intercalates/deintercalates lithium ions, a lithium metal, a lithium metal alloy, a material being capable of doping and dedoping lithium, a transition metal oxide, or a combination thereof.

The material that reversibly intercalates/deintercalates lithium ions may be a carbon material which is a suitable carbon-based negative active material, and examples thereof may include crystalline carbon, amorphous carbon, or a combination thereof. Examples of the crystalline carbon may include graphite such as amorphous, sheet-shape, flake, spherical shape or fiber-shaped natural graphite or artificial graphite. Examples of the amorphous carbon may include soft carbon or hard carbon, a mesophase pitch carbonized product, fired coke, and the like. The lithium metal alloy may be an alloy of lithium and a metal selected from Na, K, Rb, Cs, Fr, Be, Mg, Ca, Sr, Si, Sb, Pb, In, Zn, Ba, Ra, Ge, Al, and Sn. The material being capable of doping and dedoping lithium may be Si, $SiO_x$ (0<x<2), a Si—C composite, a Si—Z alloy, Sn, $SnO_2$, a Sn—C composite, a Sn—Z alloy, and the like, and at least one of these may be mixed with $SiO_2$. Specific examples of the element Z may be selected from Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Tl, Ge, P, As, Sb, Bi, S, Se, Te, Po, and a combination thereof. The transition metal oxide may be vanadium oxide, lithium vanadium oxide, and the like.

The binder and the conductive material used in the negative electrode 112 may be the same as the binder and conductive material of the aforementioned positive electrode 114.

The positive electrode 114 and the negative electrode 112 may be manufactured by mixing each active material composition including each active material and a binder, and optionally a conductive material in a solvent, and coating the active material composition on each current collector. In an implementation, the solvent may be, e.g., N-methylpyrrolidone or the like.

The electrolyte solution may include, e.g., an organic solvent and a lithium salt.

The organic solvent serves as a medium for transmitting ions taking part in the electrochemical reaction of a battery. Examples thereof may include a carbonate solvent, an ester solvent, an ether solvent, a ketone solvent, an alcohol solvent, and an aprotic solvent. The carbonate solvent may be dimethyl carbonate, diethyl carbonate, dipropyl carbonate, methylpropyl carbonate, ethylpropyl carbonate, methylethyl carbonate, ethylene carbonate, propylene carbonate, butylene carbonate, or the like, and the ester solvent may include methyl acetate, ethyl acetate, n-propyl acetate, 1,1-dimethylethyl acetate, methylpropionate, ethylpropionate, γ-butyrolactone, decanolide, valerolactone, mevalonolactone, caprolactone, or the like. The ether solvent may include dibutyl ether, tetraglyme, diglyme, dimethoxyethane, 2-methyltetrahydrofuran, tetrahydrofuran, or the like, and the ketone solvent may include cyclohexanone or the like. The alcohol solvent may include ethanol, isopropyl alcohol, or the like, and the aprotic solvent may include nitriles such as R—CN (R is a C2 to C20 linear, branched, or cyclic hydrocarbon group, a double bond, an aromatic ring, or an ether bond), and the like, amides such as dimethyl formamide, dioxolanes such as 1,3-dioxolane, sulfolanes, or the like.

The organic solvent may be used alone or in a mixture of two or more, and when the organic solvent is used in a mixture of two or more, the mixture ratio may be controlled in accordance with a desirable cell performance.

The lithium salt is dissolved in an organic solvent, supplies lithium ions in a battery, basically operates the rechargeable lithium battery, and improves lithium ion transportation between positive and negative electrodes therein. Examples of the lithium salt may include $LiPF_6$, $LiBF_4$, $LiSbF_6$, $LiAsF_6$, $LiN(SO_3C_2F_5)_2$, $LiN(CF_3SO_2)_2$, $LiC_4F_9SO_3$, $LiClO_4$, $LiAlO_2$, $LiAlCl_4$, $LiN(C_xF_{2x+1}SO_2)(C_yF_{2y+1}SO_2)$ (x and y are natural numbers), LiCl, LiI, $LiB(C_2O_4)_2$, or a combination thereof.

The lithium salt may be used in a concentration ranging from about 0.1 M to about 2.0 M. When the lithium salt is included within the above concentration range, an electrolyte may have excellent performance and lithium ion mobility due to optimal electrolyte conductivity and viscosity.

The following Examples and Comparative Examples are provided in order to highlight characteristics of one or more embodiments, but it will be understood that the Examples and Comparative Examples are not to be construed as limiting the scope of the embodiments, nor are the Comparative Examples to be construed as being outside the scope of the embodiments. Further, it will be understood that the embodiments are not limited to the particular details described in the Examples and Comparative Examples.

Synthesis Example: Preparation of (Meth)Acryl Heat Resistant Binder

Synthesis Example 1: AM/AMPS=95/5, Molecular Weight: 350,000, Glass Transition Temperature: 160° C.

Distilled water (6361 g), acrylamide (675.3 g, 9.5 mol), potassium persulfate (2.7 g, 0.01 mol), 2-acrylamido-2-methylpropanesulfonic acid (103.6 g, 0.5 mol), and a 5 N lithium hydroxide aqueous solution (based on a total amount of 1.05 equivalent of the 2-acrylamido-2-methylpropane sulfonic acid) were put in a 10 L four-necked flask equipped with an agitator, a thermometer, and a cooling tube, and an internal pressure of the flask was reduced to 10 mmHg with a diaphragm pump and then, recovered to a normal pressure with nitrogen, which was repeated three times.

The reaction solution was controlled to be stable between 65° C. to 70° C. for 12 hours. The reaction solution was cooled down to ambient temperature and adjusted to have pH in a range of 7 to 8 by using a 25% ammonia aqueous solution.

In this method, poly(acrylamide-co-2-acrylamido-2-methylpropanesulfonic acid)sodium salt was prepared. The acrylamide and the 2-acrylamido-2-methylpropanesulfonic acid had a mole ratio of 95:5. When a non-volatile component was measured by taking about 10 mL of the reaction solution (a reaction product), the result was 9.5% (a theoretical value: 10%).

Examples: Manufacture of Separator for Rechargeable Lithium Battery

Example 1

The heat resistant binder (10 wt % in distilled water) according to Synthesis Example 1, and first inorganic particles (boehmite, 1.2 μm) prepared by milling with a bead mill at 25° C. for 30 minutes and polyethylene particles (0.96 μm, PE Wax, Mistui Chemicals Inc.) in a weight ratio of 50:50 were put in water and stirred to prepare an organic/inorganic dispersion having the heat resistant binder:a sum of the first inorganic particles and the polyethylene particles in a weight ratio of 1:28. Subsequently, water was added thereto so that a total solid content was 25 wt % to prepare a composition for a coating layer. The composition was coated to be 3 μm thick on one surface of a 6.5 μm-thick polyethylene porous substrate (air permeability: 120 sec/100 cc, punctuation strength: 480 kgf, SK global chemical Co., Ltd.) using a bar-coating method and then, dried at 70° C. for 10 minutes to manufacture a separator for a rechargeable lithium battery.

Example 2

A separator for a rechargeable battery was manufactured according to the same method as Example 1 except that the first inorganic particles and the polyethylene particles were used in a weight ratio of 25:75.

Example 3

A separator for a rechargeable battery was manufactured according to the same method as Example 1 except that the first inorganic particles and polyethylene particles were used in a weight ratio of 5:95.

Comparative Example 1

A separator for a rechargeable battery was manufactured according to the same method as Example 1 except that the first inorganic particles (boehmite, 1.2 μm) were used in an amount of 100% (i.e., the polyethylene particles were omitted).

Comparative Example 2

A separator for a rechargeable battery was manufactured according to the same method as Example 1 except that polyvinyl alcohol (a weight average molecular weight of 180,000, 5 wt % in distilled water, Sigma-Aldrich Corp.) was used instead of the heat resistant binder according to Synthesis Example 1, and the polyvinyl alcohol: the sum of the first inorganic particles and the polyethylene particles were used in a weight ratio of 1:28.

Comparative Example 3

A separator for a rechargeable battery was manufactured according to the same method as Example 1 except that an acryl binder including 100 mol % of a structural unit derived from acrylic acid (a weight average molecular weight of about 160,000, 12 wt % in distilled water, Hansol Chemical) was used instead of the heat resistant binder according to Synthesis Example 1, and the acryl binder: the sum of the first inorganic particles and the polyethylene particles were used in a weight ratio of 1:28.

Comparative Example 4

In order to prepare a coating crude solution having a solid content of 12 wt %, modified-PVdF was dissolved in acetone to prepare a first binder solution having a solid content of 5 wt %. Subsequently, 25 wt % of 500 nm $Al_2O_3$ (LS235A, Nippon Light Metal Company Ltd.) was added to acetone (Daejung Chemicals & Metals Co., Ltd.) and then, milled at 25° C. for 3 hours to prepare inorganic dispersion. The binder solution and the alumina dispersion were mixed so that a weight ratio between the binder solid content and the alumina solid content was 1:5, and acetone was added thereto so that a total solid content was 12 wt % to prepare a porous layer composition. The porous layer composition was coated to be respectively 3 μm thick on both surfaces of a 6.5 μm-thick polyethylene porous substrate (air permeability: 120 sec/100 cc, punctuation strength: 480 kgf, SK global chemical Co., Ltd.) and then, dried at 70° C. for 10 minutes to manufacture a separator.

Comparative Example 5

The heat resistant binder (10 wt % in distilled water) according to Synthesis Example 1 and the first inorganic particles (boehmite, 1.2 μm) milled and dispersed at 25° C. for 30 minutes were put in water as a solvent and then, stirred to prepare a dispersion having the heat resistant binder: the first inorganic particles in a weight ratio of 1:28. Water was added thereto so that a total solid content was 25 wt % to prepare a composition for a coating layer. The composition for a coating layer was coated to be 3 μm thick on a 6.5 μm-thick polyethylene porous substrate (air permeability: 120 sec/100 cc, punctuation strength: 480 kgf, SK global chemical Co., Ltd.) and then, dried at 70° C. for 10 minutes to manufacture a separator for a rechargeable lithium battery. On both of the surfaces of the separator, an electrode adhesive binder (an acryl particle-type binder, Zeon, particle size: 0.3 to 0.5 μm) was respectively coated to be 0.5 μm thick and dried to manufacture a separator for a lithium secondary battery.

Example 4

A separator for a rechargeable lithium battery was manufactured according to the same method as Example 1 by coating the composition for a coating layer according to Example 1 to be respectively 3 μm thick on both of the surfaces of a 6.5 μm-thick polyethylene porous substrate (air permeability: 120 sec/100 cc, punctuation strength: 480 kgf, SK global chemical Co., Ltd.) in a bar coating method.

Example 5

The heat resistant binder (10 wt % in distilled water) according to Synthesis Example 1 and second inorganic particles (boehmite, 1.2 μm) milled and dispersed at 25° C. for 30 minutes were put in water as a solvent and stirred to prepare a dispersion having the heat resistant binder: the second inorganic particles in a weight ratio of 1:28. Subsequently, water was added thereto so that a total solid content was 25 wt % to prepare a composition for a heat resistant layer.

In addition, the heat resistant binder (10 wt % in distilled water) according to Synthesis Example 1, and a first inorganic particles (boehmite, 1.2 μm) milled and dispersed at 25° C. for 30 minutes and polyethylene particles (0.96 μm, PE Wax, Mitsui Chemicals Inc.) in a weight ratio of 50:50 were put in water as a solvent and stirred to prepare an organic/inorganic dispersion having the heat resistant binder: the sum of the first inorganic particles and the polyethylene particles in a weight ratio of 1:28. Subsequently, water was added thereto so that a total solid content was 25 wt % to prepare a composition for a coating layer.

Subsequently, the composition for a heat resistant layer was bar-coated to be 3 μm thick on a first surface of a 6.5 μm-thick polyethylene porous substrate (air permeability: 120 sec/100 cc, punctuation strength: 480 kgf, SK global chemical Co., Ltd.), and the composition for a coating layer was coated to be 3 μm thick on a second surface thereof, and then, both of the coated surfaces were dried at 70° C. for 10 minutes to manufacture a separator for a rechargeable lithium battery.

Example 6

A separator for a rechargeable lithium battery was manufactured according to the same method as Example 5 except that the composition for a heat resistant layer according to Example 5 was coated to be 3 μm thick on one surface of a polyethylene porous substrate and dried, and the composition for a coating layer was coated to be 3 μm thick and dried on the heat resistant layer.

Example 7

A separator for a rechargeable lithium battery was manufactured according to the same method as Example 6 except that the composition for a coating layer according to Example 5 was further coated to be 3 μm thick on the other surface of the separator for a rechargeable lithium battery according to Example 6 and dried.

Example 8

A separator for a rechargeable lithium battery was manufactured by coating and drying the composition for a heat resistant layer according to Example 5 to be respectively 1.5 μm thick on both of the surfaces of a polyethylene porous substrate and subsequently, coating and drying the composition for a coating layer according to Example 5 to be respectively 1.5 μm thick on the heat resistant layers.

Example 9

A separator for a rechargeable lithium battery was manufactured by coating and drying an electrode adhesive binder (an acryl particle-type binder, Zeon, 0.3 to 0.5 μm) to be respectively 0.5 μm thick on both surfaces of the separator prepared according to Example 1.

Evaluation Examples

Evaluation Example 1: Air Permeability

The separators according to Examples 1 to 9 and Comparative Examples 1 to 5 were respectively cut into a size holding a 1 inch circle to prepare ten specimens at ten different points, and then, time taken until 100 cc of air passed each specimen under a predetermined pressure (0.05 MPa) was measured by using an air permeability measuring device (Asahi Seiko Co., Ltd.). The time was respectively five times measured and then, averaged to obtain the air permeability. The results are shown in Tables 1 and 2.

Evaluation Example 2: Air Permeability after Stored at High Temperature

The separators according to Examples 1 to 9 and Comparative Examples 1 to 5 were respectively cut into a size of 6 cm×6 cm to prepare four specimens, attached on a jig and then, stored in an oven at 120° C. for 1 hour and taken out therefrom to measure time taken until 100 cc of air passed each specimen under a predetermined pressure (0.05 MPa) by using an air permeability measuring device (Asahi Seiko Co., Ltd.). The time was measured and averaged to obtain air permeability after stored at a high temperature. The results are shown in Tables 1 and 2 and FIG. 6.

Evaluation Example 3: Thermal Shrinkage

The separators for a rechargeable battery according to Examples 4 to 9 and Comparative Examples 4 and 5 were respectively cut into a size of 8 cm×8 cm to prepare samples. The samples (after drawing a 5 cm×5 cm-size quadrangle on the surface) were inserted between paper or alumina powder, placed at 150° C. in an oven for 1 hour, and taken out of the oven, and each shrinkage ratio between machine direction (MD) and in a traverse direction (TD) was calculated by measuring sides of the quadrangles drawn on the samples. The results are shown in Table 2.

Evaluation Example 4: Resistance Characteristics

The separators for a rechargeable lithium battery according to Examples 4 to 9 and Comparative Examples 4 and 5 were respectively punched to have a diameter of 1.9 cm, and a electrolyte solution prepared by dissolving 1 M $LiPF_6$ in a propylene carbonate solvent was used to manufacture a coin cell in a dry room. The manufactured coin cell was stored at ambient temperature for 12 hours, and resistance thereof was measured while a temperature was increased by using a resistance measurement device equipped in a heating chamber, and the results are shown in FIG. 5.

Figure 5:
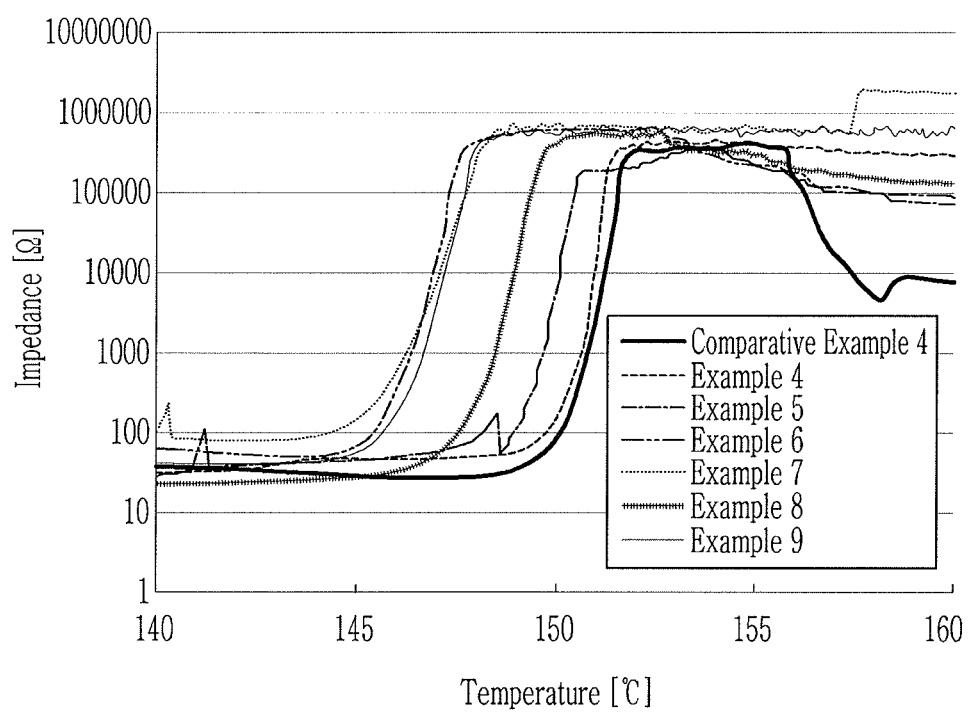
FIG. 5 illustrates a graph showing resistance characteristics depending on a temperature of the rechargeable lithium battery cells.

FIG. 5 illustrates a graph showing resistance characteristics depending on a temperature of the rechargeable lithium battery cells.

Referring to FIG. 5, as a temperature of the separators according to Examples 4 to 9 was increased, polyethylene particles were dissolved and blocked an ion movement path and shut it down, which shows that high resistance was maintained.

The separator according to Comparative Example 4 exhibited a resistance decrease as the temperature increased, and no effective shutdown occurred.

Evaluation Example 5: Substrate Binding Strength

The separators for a rechargeable lithium battery according to Examples 4 to 9 and Comparative Examples 4 and 5 were respectively cut to prepare 12 mm-wide and 50 mm-long samples. A tape was attached on the coating layer of the sample and then, about 10 to 20 mm separated therefrom, and the attached portion to the coating layer was fixed into a lower grip, while a non-attached portion thereof was fixed into an upper grip, wherein the grips were apart in a distance of 20 mm, and then, the sample was pulled in a direction of 180° to peel off the coating layer. Herein, a peeling speed was 10 mm/min, and the binding strength was obtained by three times measuring strength required to peel off the layer up to 40 mm and averaging the measurements. The peel strength results are shown in Table 2.

TABLE 1

|  | First inorganic particles:PE particles (weight ratio) | (Meth)acryl-based heat resistant binder | Coating thickness (μm) | Loading amount (g/m$^2$) | Coating density (g/μm) | Air permeability (s/100 cc) | Air permeability after stored at 120° C./1 hr (sec/100 cc) |
|---|---|---|---|---|---|---|---|
| Example 1 | 50:50 | Synthesis Example 1 | 3.0 | 2.85 | 0.95 | 141 | 10815 |
| Example 2 | 25:75 | Synthesis Example 1 | 3.0 | 2.34 | 0.78 | 146 | 28816 |
| Example 3 | 5:95 | Synthesis Example 1 | 3.0 | 1.8 | 0.6 | 152 | 29342 |
| Comparative Example 1 | 100:0 | Synthesis Example 1 | 3.0 | 3.9 | 1.3 | 142 | 145 |
| Comparative Example 2 | 50:50 | PVA | 3.0 | 2.82 | 0.94 | 192 | 984 |
| Comparative Example 3 | 50:50 | AA | 3.0 | 2.88 | 0.96 | 171 | 526 |

Figure 6:
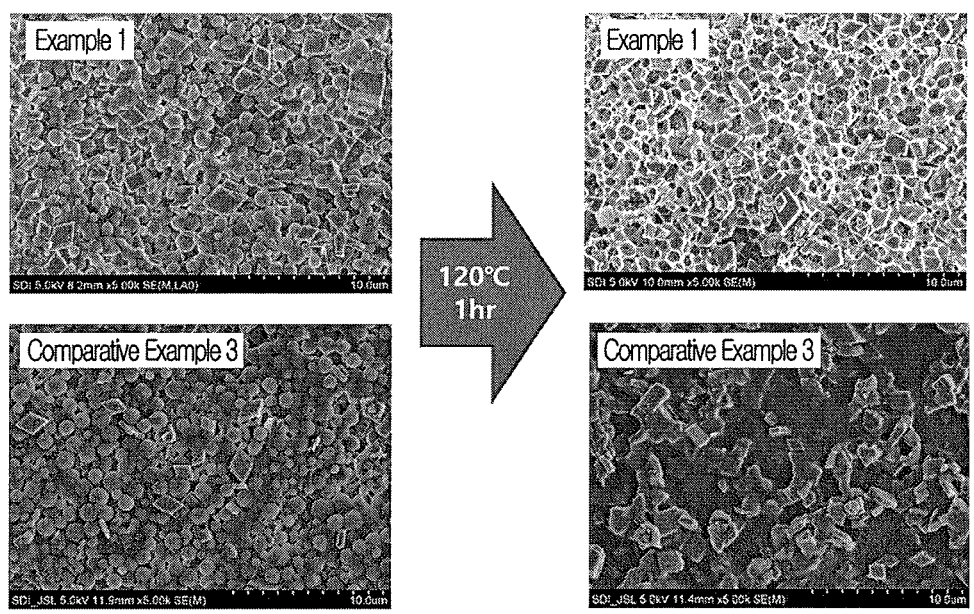
FIG. 6 illustrates SEM images of the separators for a rechargeable lithium battery according to Example 1 and Comparative Example 3 before and after being stored at a high temperature (120° C., 1 hr).

FIG. 6 illustrates SEM images of the separators for a rechargeable lithium battery according to Example 1 and Comparative Example 3 before and after being stored at a high temperature (120° C., 1 hr).

Referring to Table 1 and FIG. 6, the separators according to Examples 1 to 3 had air permeability of greater than or equal to 10,000 sec/100 cc after being stored at 120° C., and accordingly, when exposed at a high temperature, pores of the separators were blocked, which shows that an ion-transporting path was shut down. In addition, the separator had air permeability of less than 150 sec/100 cc before being exposed to a high temperature when a coating thickness was 3 μm, wherein an air permeability change was about 30 seconds compared with that of a porous substrate (120 sec/100 cc). The separators according to Comparative Examples 1 to 3 exhibited high air permeability after the coating or less than 1,000 sec/100 cc of air permeability after being stored at 120° C. and exhibited a greatly deteriorated shutdown function compared with the separators according to Examples 1 to 3.

TABLE 2

| | First inorganic particles:PE particles (weight ratio) | Coating thickness (μm) | Shrinkage rate after being stored at 150° C./1 hr (MD/TD) | Air permeability after stored at 120° C./1 hr (sec/100 cc) | Electrode adherence (gf) |
|---|---|---|---|---|---|
| Comparative Example 4 | 100:0 | 3.0/3.0 | 51/51 | 325 | 0 |
| Comparative Example 5 | 100:0 | 3.5/3.5 | 3/3 | 160 | 15 |
| Example 4 | 50:50 | 3.0/3.0 | 50/50 | 33195 | 0 |
| Example 5 | 50:50 | 3.0/3.0 | 3/3 | 26314 | 0 |
| Example 6 | 50:50 | 3.0/3.0 | 3/3 | 22026 | 0 |
| Example 7 | 50:50 | 3.0/3.0 | 3/3 | 27626 | 0 |
| Example 8 | 50:50 | 3.0/3.0 | 3/3 | 24763 | 0 |
| Example 9 | 50:50 | 3.5/3.5 | 50/50 | 25372 | 15 |

Referring to Table 2, the separators according to Examples 4 to 9 exhibited air permeability of greater than or equal to 20,000 sec/100 cc after being stored at 120° C. for 1 hour and thus exhibited an excellent shutdown effect. In addition, the separators additionally coated with a heat resistant layer (according to Examples 5 to 8) exhibited a shrinkage rate of about 3% after being stored at 150° C. for 1 hour and thus realized excellent heat resistance.

In addition, the separator additionally including an adhesive layer (according to Example 9) realized excellent adherence.

By way of summation and review, if a battery were to be exposed to a high temperature environment due to abnormal behavior, a separator could physically shrink or could be damaged due to melting characteristics at a low temperature. For example, the positive and negative electrodes could contact each other and could cause an explosion of the battery. Suppressing shrinkage of a separator and ensuring safety of a battery may be considered.

One or more embodiments may provide a rechargeable lithium battery having high heat resistance and excellent penetration safety by applying a separator for a rechargeable lithium battery capable of delaying a rapid rise in temperature and exothermic amounts.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A separator for a rechargeable lithium battery, the separator comprising:
    a porous substrate, and
    a coating layer on at least one surface of the porous substrate,
    wherein:
    the coating layer includes:
        a heat resistant binder including a (meth)acryl copolymer including a first structural unit and a second structural unit, the first structural unit being a structural unit of a (meth)acrylamide and the second structural unit including a structural unit of a (meth)acrylamido sulfonic acid, a (meth)acrylamido sulfonate salt, or a combination thereof;
        polyethylene particles; and
        first inorganic particles,
    an average particle size (D50) of the first inorganic particles is larger than an average particle size (D50) of the polyethylene particles,
    the (meth)acryl copolymer has a glass transition temperature (Tg) of 150° C. or higher, and
    the (meth)acryl copolymer is an alternate polymer in which the first and second structural units are alternately distributed or a random polymer in which the first and second structural units are randomly distributed.

2. The separator for a rechargeable lithium battery as claimed in claim 1, wherein the average particle size (D50) of the first inorganic particles is 1.0 μm to 3.0 μm.

3. The separator for a rechargeable lithium battery as claimed in claim 1, wherein the average particle size (D50) of the polyethylene particles is 0.1 μm to 1.0 μm.

4. The separator for a rechargeable lithium battery as claimed in claim 1, wherein a weight ratio of the first inorganic particles and the polyethylene particles is 50:50 to 1:99.

5. The separator for a rechargeable lithium battery as claimed in claim 1, wherein a weight ratio of the heat resistant binder:a sum of the first inorganic particles and the polyethylene particles is 1:20 to 1:40.

6. The separator for a rechargeable lithium battery as claimed in claim 1, wherein the first inorganic particles include $Al_2O_3$, $SiO_2$, $TiO_2$, $SnO_2$, $CeO_2$, MgO, NiO, CaO, GaO, ZnO, $ZrO_2$, $Y_2O_3$, $SrTiO_3$, $BaTiO_3$, $Mg(OH)_2$, boehmite, or a combination thereof.

7. The separator for a rechargeable lithium battery as claimed in claim 1, wherein:
    the first structural unit is included in an amount of 55 mol % to 95 mol %, based on 100 mol % of the (meth)acryl copolymer, and
    the second structural unit is included in an amount of 5 mol % to 45 mol %, based on 100 mol % of the (meth)acryl copolymer.

8. The separator for a rechargeable lithium battery as claimed in claim 7, wherein the second structural unit includes:
    a structural unit of a (meth)acrylic acid, a (meth)acrylate, a (meth)acrylonitrile, or a combination thereof in an amount of 0 mol % to 40 mol %, based on 100 mol % of the (meth)acryl copolymer, and the structural unit of a (meth)acrylamido sulfonic acid, a (meth)acrylamido sulfonate salt, or a combination thereof in an amount of 0 mol % to 10 mol %, based on 100 mol % of the (meth)acryl copolymer, provided that the second structural unit is included in a total amount of 5 mol % to 45 mol %, based on 100 mol % of the (meth)acryl copolymer.

9. The separator for a rechargeable lithium battery as claimed in claim 8, wherein:

the first structural unit is represented by Chemical Formula 1, the second structural unit of a (meth)acrylic acid, a (meth)acrylate, or a (meth)acrylonitrile is represented by Chemical Formula 2, Chemical Formula 3, Chemical Formula 4, or a combination thereof, and the second structural unit of a (meth)acrylamido sulfonic acid, or a (meth)acrylamido sulfonate salt is represented by Chemical Formula 5, Chemical Formula 6, Chemical Formula 7, or a combination thereof:

[Chemical Formula 1]

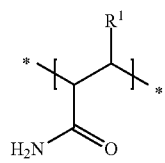

[Chemical Formula 2]

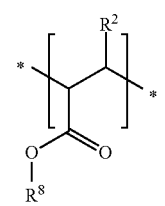

[Chemical Formula 3]

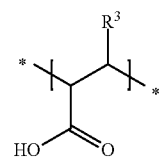

[Chemical Formula 4]

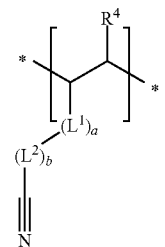

[Chemical Formula 5]

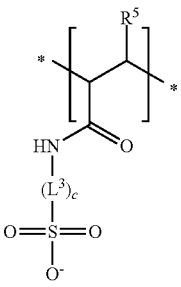

[Chemical Formula 6]

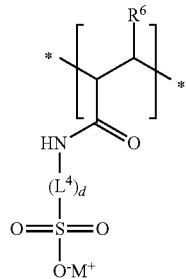

[Chemical Formula 7]

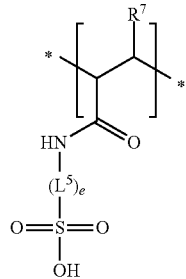

in Chemical Formula 1 to Chemical Formula 7, $R^1$ to $R^7$ are each independently hydrogen or a $C^1$ to $C^6$ alkyl group, $R^8$ is a substituted or unsubstituted $C^1$ to $C^{20}$ alkyl group, $L^1$ is —C(=O)—, —C(=O)O—, —OC(=O)—, —O—, or —C(=O)NH—, $L^2$ to $L^5$ are each independently a substituted or unsubstituted C1 to C10 alkylene group, a substituted or unsubstituted C3 to C20 cycloalkylene group, a substituted or unsubstituted C6 to C20 arylene group, or a substituted or unsubstituted C3 to C20 divalent heterocyclic group, a, b, c, d and e are each independently an integer of 0 to 2, * is a linking point, and M is an alkali metal.

10. The separator for a rechargeable lithium battery as claimed in claim 1, wherein a thickness of the coating layer is 1 μm to 5 μm.

11. The separator for a rechargeable lithium battery as claimed in claim 1, further comprising a heat resistant layer or an adhesive layer.

12. The separator for a rechargeable lithium battery as claimed in claim 11, wherein:

the separator includes the heat resistant layer, the heat resistant layer is on at least one surface of the porous substrate, and the coating layer is on another surface of the porous substrate or on a surface of the heat resistant layer.

13. The separator for a rechargeable lithium battery as claimed in claim 11, wherein:

the separator includes the adhesive layer, and the adhesive layer is on a surface of the porous substrate, a surface of the heat resistant layer, or a surface of the coating layer.

14. The separator for a rechargeable lithium battery as claimed in claim 11, wherein:

the separator includes the heat resistant layer, and the heat resistant layer includes a heat resistant binder and second inorganic particles.

15. The separator for a rechargeable lithium battery as claimed in claim 14, wherein an average particle diameter of the second inorganic particles is 0.1 μm to 3.0 μm.

16. The separator for a rechargeable lithium battery as claimed in claim 11, wherein:
the separator includes the adhesive layer, and
the adhesive layer includes a particle-shaped (meth)acryl adhesive binder or a particle-shaped fluorine adhesive binder.

17. The separator for a rechargeable lithium battery as claimed in claim 11, wherein:
the separator includes the adhesive layer, and
a thickness of the adhesive layer is 0.1 μm to 1.0 μm.

18. A rechargeable lithium battery, comprising:
a positive electrode;
a negative electrode; and
the separator for a rechargeable lithium battery as claimed in claim 1.

* * * * *